United States Patent [19]
Gluckin

[11] Patent Number: 5,154,659
[45] Date of Patent: Oct. 13, 1992

[54] METHOD OF MAKING MOLDED BRASSIERE CUP AND SIDE PANEL

[76] Inventor: Gerald Gluckin, 440 E. 57th St., New York, N.Y. 10022

[21] Appl. No.: 628,095

[22] Filed: Dec. 14, 1990

[51] Int. Cl.$^5$ ............................. A41C 3/00; A41C 3/12
[52] U.S. Cl. ........................................ 450/39; 450/65; 450/66; 450/92; 450/93
[58] Field of Search ..................... 450/37, 38, 39, 40, 450/41, 42, 43, 59, 60, 61, 65, 66, 92, 93; 2/67, 73, 105, 106

[56] References Cited

U.S. PATENT DOCUMENTS

| | | | |
|---|---|---|---|
| 2,400,499 | 5/1946 | Gerace | 450/60 X |
| 2,485,313 | 10/1949 | Rabinowitz | 450/60 X |
| 2,867,889 | 1/1959 | Thompson, Jr. | 450/92 X |
| 2,893,396 | 7/1959 | Thompson, Jr. | 450/92 X |
| 3,101,717 | 8/1963 | Korman | 450/39 |
| 3,202,565 | 8/1965 | Loftin | 450/39 X |
| 3,225,768 | 12/1965 | Galitzki et al. | 450/39 |
| 3,254,653 | 6/1966 | Krieger | 450/39 |
| 3,630,208 | 12/1971 | Werth | 450/60 X |
| 3,952,752 | 4/1976 | Huttle, Jr. | 450/60 |
| 4,172,002 | 10/1979 | Gluckin | 450/39 |
| 4,372,321 | 2/1983 | Robinson | 450/39 |
| 4,572,195 | 2/1986 | Hyams | 450/39 |

FOREIGN PATENT DOCUMENTS 0593433 3/1960 Canada ................................ 450/39

Primary Examiner—Werner H. Schroeder
Assistant Examiner—Jeanette E. Chapman

[57] ABSTRACT

A brassiere cup molding method using moldable and non-moldable fabric blanks in which a mold with a cup shape is used to project into a cup shape a fabric blank that is stretchable but absent of plastic moldable content, i.e. non-moldable, while it is in spanning relation across an opening of a fabric blank having a plastic content, i.e. moldable, wherein the moldable blank assumes a molded frusto conical shape about the opening therein which holds the stretch fabric, although not molded, in the cup shape that was imparted to it by the mold by not allowing the stretch fabric to return to its pre-stretched flat condition.

2 Claims, 3 Drawing Sheets

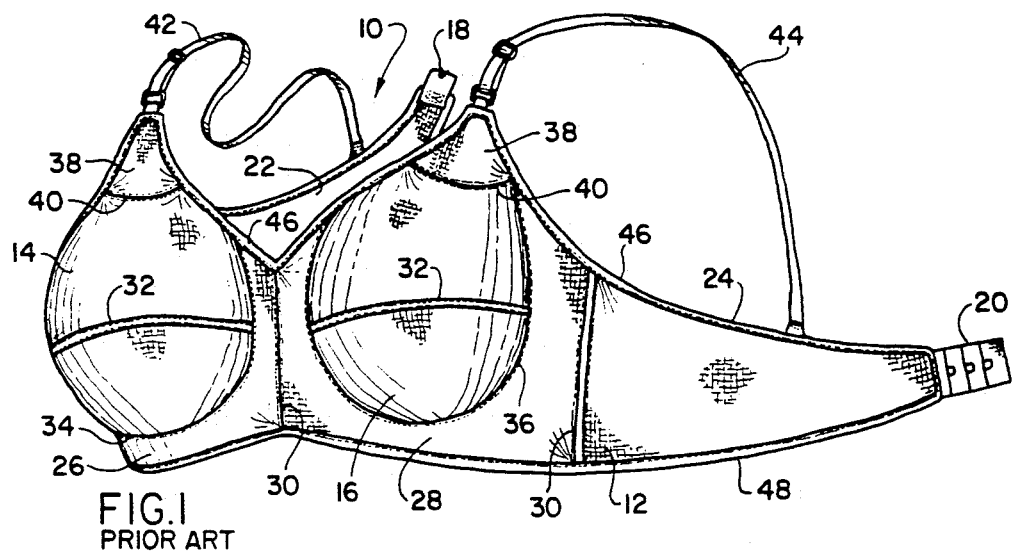
FIG.1
PRIOR ART
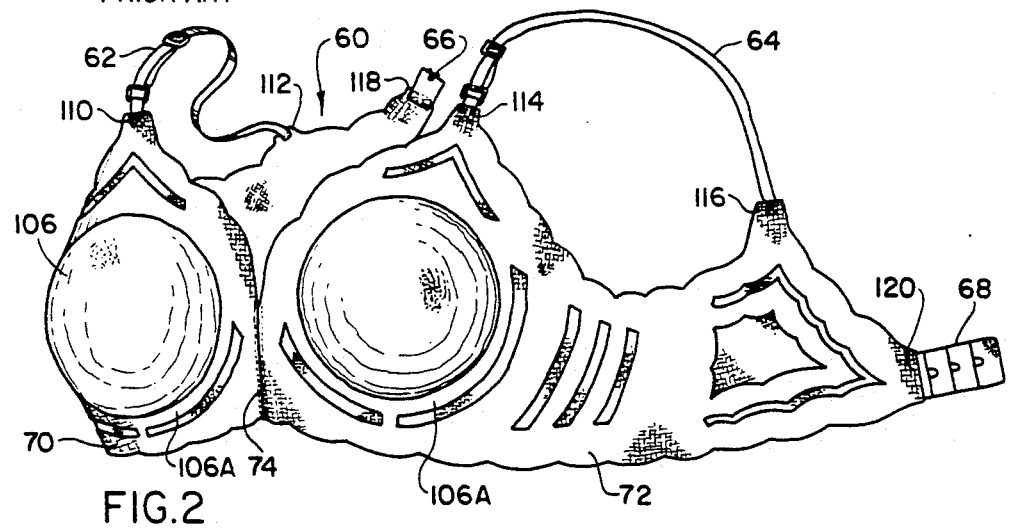
FIG.2
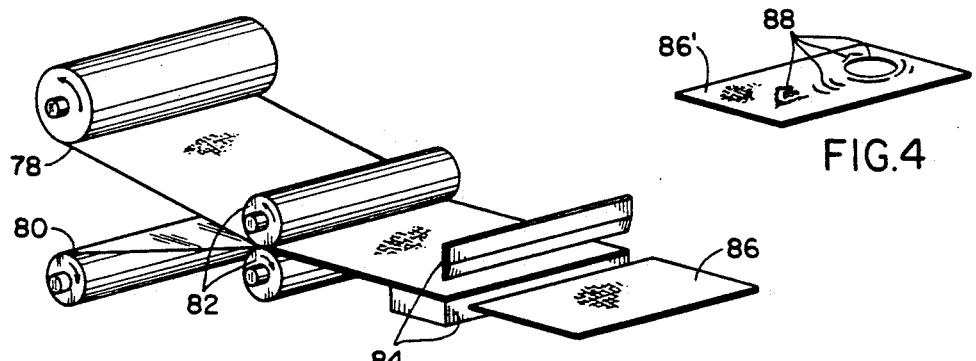
FIG.3
FIG.4

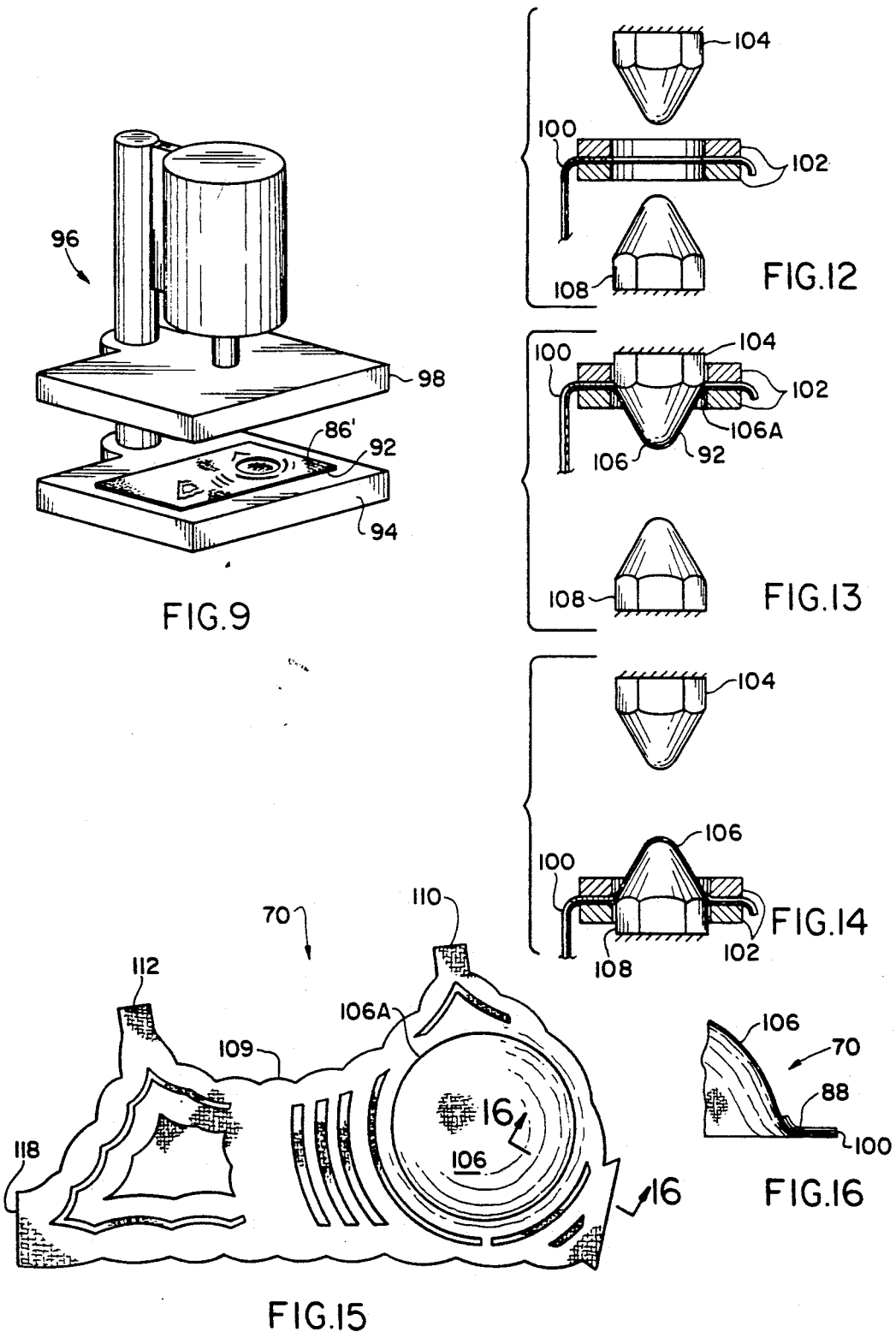

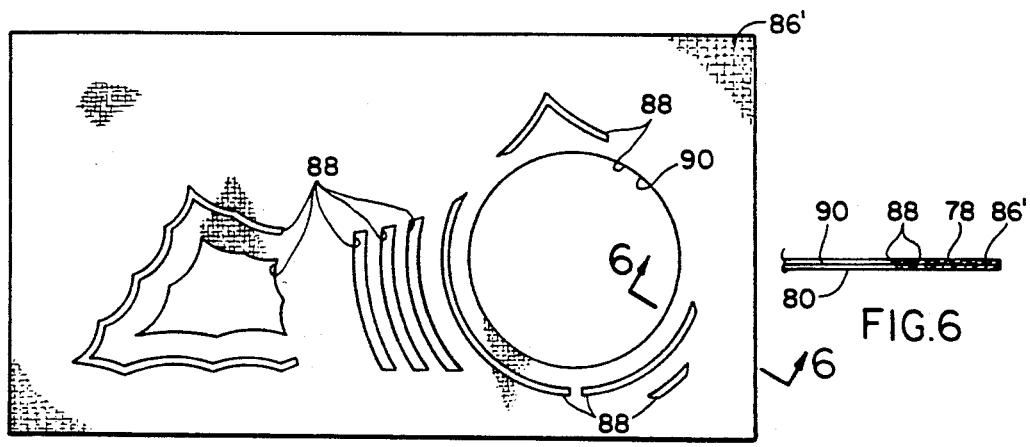
FIG.5 / FIG.6
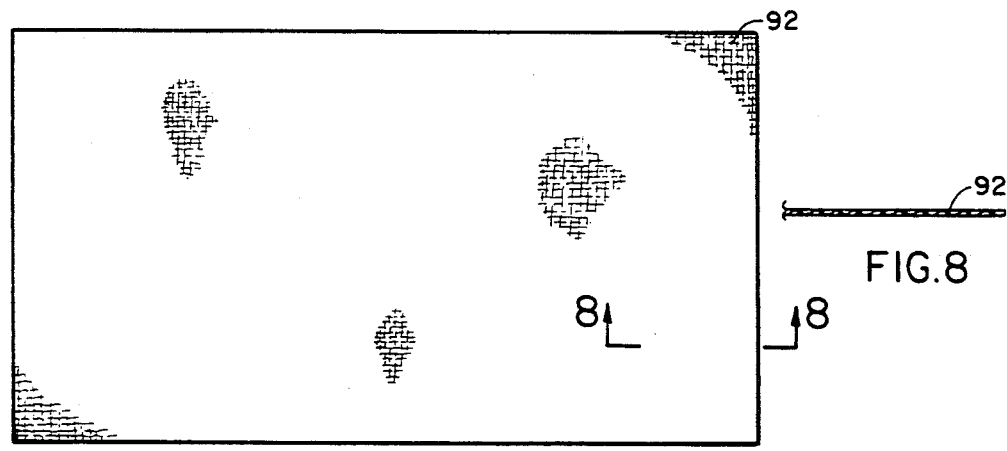
FIG.7 / FIG.8
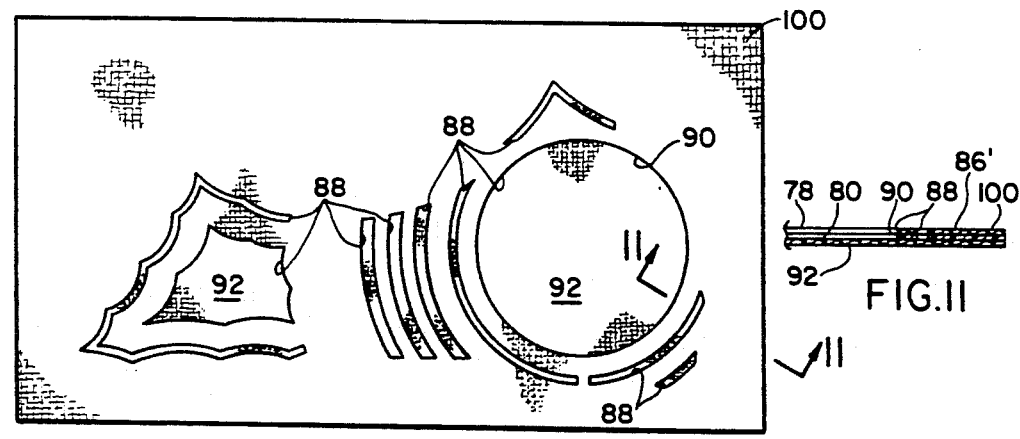
FIG.10 / FIG.11

METHOD OF MAKING MOLDED BRASSIERE CUP AND SIDE PANEL

The present invention relates generally to improvements for a brassiere cup, and more particularly to an improved shape-supported molded brassiere cup that uses moldable and also non-moldable construction materials the latter non-moldable fabric material being, in a preferred embodiment, light weight stretchable cotton and, as such, contributing significantly to the comfort in wearing the garment.

To provide stiffening and shaping to a brassiere cup resort is had to embodying wires, plastic stays, or the like in the construction of the cup, in any one of a variety of ways, all as is exemplified by the cup constructions of prior U.S. Pat. Nos. 3,196,460, 2,611,898, and 2,686,312, to mention but a few. The prior art wire or stay used is unavoidably pressed bodily into the user, and no matter how well cushioned, correspondingly unavoidably contributes to discomfort during wearing use of the brassiere.

In my prior U.S. Pat. 4,172,002 issued on Oct. 23, 1979, there is disclosed and illustrated a method of molding a cup shape in moldable fabric which consists, as described in my patent, of fabric having a plastic content which in response to heat imparted thereto by a cup-shaped molding die assumes the cup shape of this die. In this way, the cup is shaped while at the same time obviating the need to embody in the construction of the brassiere of wires, plastic stays, or the like, as noted above in connection with the referenced prior art patents.

While the molded brassiere cup of U.S. Pat. 4,172,002 is a significant improvement over the prior art, it contemplates the use of moldable fabric in the sensitive breast area of the user, and it has been found in practice that such moldable fabric due to its fiber content, thickness and weight, and other physical attributes, deemed advantageous for its moldable capacity and function, is not entirely conducive to wearing comfort.

Broadly, it is an object of the present invention to provide an improved shaped brassiere cup overcoming the foregoing and other shortcomings of the prior art. Specifically, it is an object to use to advantage the molding of the cup, rather than the prior art stitching construction thereof, and additionally, as a patentable advance over U.S. Pat. 4,172,002, also incorporating in the brassiere construction a significantly more comfortable non-moldable fabric in the sensitive-to-the-feel cup area, all as will be explained in greater detail subsequently herein.

The description of the invention which follows, together with the accompanying drawings should not be construed as limiting the invention to the example shown and described, because those skilled in the art to which this invention appertains will be able to devise other forms thereof within the ambit of the appended claims.

FIG. 1 is a perspective view of a known brassiere exemplifying the prior art;

FIG. 2 is a perspective view of the within inventive brassiere for comparison with the prior art brassiere of FIG. 1;

FIG. 3 is a perspective view of a laminating and shearing process used in preparing components for the within brassiere;

FIG. 4 is a perspective view of a work-in-process brassiere component or blank;

FIG. 5 is an elevational view of the blank shown in FIG. 4;

FIG. 6 is a sectional view as taken along line 6—6 of FIG. 5;

FIG. 7 is an elevational view of another work-in-process brassiere component or blank;

FIG. 8 is a sectional view as taken along line 8—8 of FIG. 7;

FIG. 9 is a perspective view of a molding apparatus used in fabricating the within inventive brassiere;

FIG. 10 is an elevational view of an assembly of the work-in-process blanks;

FIG. 11 is a sectional view as taken along line 11—11 of FIG. 10;

FIGS. 12, 13, and 14 are sequential elevational views, partly in section, showing the forming, by molding, of the brassiere cup for the within brassiere;

FIG. 15 is an elevational view of a completed brassiere cup and side panel made according to the present invention; and FIG. 16 is a sectional view as taken along line 16—16 of FIG. 15.

A popular strap-type brassiere 10 with a cooperating rear hook and eyelet connector is shown in FIG. 1 as prior art and exemplifies a brassiere article of manufacture which incorporates many of the features that frequently have been found to be uncomfortable to the wearer and/or contribute to the expense of manufacture of the product. Brassiere 10 is typically made of one of the available stretch-type cotton, nylon or polyester fabrics currently used in the trade, and consists generally of a girth band 12 which supports right and left breast cups 14 and 16. Band 12 has a conventional fastening means comprised of a hook 18 and an eyelet strip 20. Hook 18 is sewn to the rear edge of the triangular shaped side panel 22 while eyelet strip 20 is similarly connected to the rear edge of the left side panel 24. Band 12 usually extends along the front of the brassiere 10 and includes respective right and left underbreast panels 26 and 28. Adjacent panels in this brassiere construction are typically joined by a plurality of vertical seams as denoted by the reference numeral 30. Cups 14 and 16 can each be formed as a single piece, but more often are two halves joined by horizontal seams 32. Cups 14 and 16 are stitched in place using seams 34 and 36, and for size adjustment may have elastic patches 38 attached along a seam 40. Size adjustable shoulder straps 42 and 44 are conventionally attached as shown.

To finish brassiere 10, use is made of a top hem 46 and a bottom hem 48, and these hems may additionally incorporate decorative lace strips, bows, piping or binding strips. This decorative trim is also often incorporated in the seams 30, 32, 34, 36, and 40.

After a number of wearings, washings and dryings, there is documentation of the user of brassiere 10 complaining of a bunching, lumping, puckering or wrinkling along seams 30, 32, 34, 36, and 40, which is undoubtedly due to uneven shrinkage of the stitchings, or of the body fabric and trim. A common complaint is that bottom hem 48 permanently folds over itself, causing much discomfort to the wearer.

The within inventive brassiere 60, shown in FIG. 2, obviates these prior art shortcomings. In a preferred embodiment it consists of conventional right and left shoulder straps 62, 64; a standard connector hook 66 and eyelet strip 68; and right and left cups and side panels 70, 72. Aside, however, from the stitching that anchors straps 62 and 64 and the hook 66 and eyelet strip 68, the only sewing required on brassiere 60 is the center seam 74.

Each of the brassiere side panels 70 and 72 is identically constructed, and thus for brevitys' sake only the development of the right cup side panel 70 (as worn by the user) will now be described.

As best seen in FIG. 3, a supply of laminated material is produced by heat fusing a non-plastic content fabric 78 to a heat sensitive polyester plastic-fill 80 by passage between the nip of opposed heated rollers 82. Any appropriate heating apparatus or heat-sealer, may be used for this purpose, one such appropriate device being a device sold under the trademark "FUS-0-MATIC" by General Fabric Fusing, Inc. of Cincinnati, Ohio. The fabric 28 will be understood to be of conventional construction, namely interwoven fibers, such as a cotton tricot, and thus essentially non-fusable. However, the partial melting of the plastic film 80 and the pressing thereof into the interstices of the cotton fabric 78 results in an attachment of the film 80 to the fabric 76. The lamination 78, 80 is then conveyed into a shearing station 84 and is die cut into rectangular work-in-process blanks 86. Blanks 86 are sized so as to be slightly larger than a prior art side panel 22, 24 and underbreast panel 26, 28 combination. The height of blank 86 is also sized to be larger than a prior art cup 14, 16 with a patch 38 and underbreast panel 26, 28 combination.

In FIGS. 4, 5, and 6 there is shown an array of decorative shaped cutouts 88, which are imparted, using a cutting die, in selected locations throughout a laminated blank 86. Of particular note, and as best seen in FIG. 5, one cutout 90, in prepared blank 86, is destined to serve as a frame or encircling support for the right side breast cup 106, while the other cutouts 88 are intended to aid in ventilation, mechanical stretching or for enhancing the decorative appearance of the finished brassiere 60.

In FIGS. 7 and 8, a second work-in-process component or blank 92 is shown and will be understood to be of stretchable body cloth which could be polyester lace, shadow cloth, cotton or the like. As a method component it is supplied in the same rectangular size as a cooperating laminated blank 86. As best shown in FIG. 9, blank 92 is placed on the lower heated platen 94 of appropriate heat sealer 96 and is then covered by the prepared die cut blank 86 in sandwich fashion. Upper platen 98, heated to approximately 400° F., is then urged through descending movement upon the blanks 92 and 86, resulting in a three layer fused laminate 100, as best seen in FIG. 11. After cooling and curing, the laminated assembly 100 is clamped in a frame 102 in preparation for the molding thereof as illustrated sequentially in FIGS. 12, 13, and 14. The assembly 100 is raised gradually on guides (not shown) against a heated mandrel 104 (FIG. 13) resulting in the cotton fabric in spanning relation across the brassier cup opening 90 being projected in a cup shape by the molding die 104 through this opening. At this time the heat sensitive plastic content of blank 86 of the assembly 100 which bounds the cutout or opening 90 is molded into a partial frusto conical shape 106A, and has a significant function soon to be explained. Continuing now however with the description of the method, as the next step, the frame 102 is then quickly lowered so that cup 106 makes contact with a cold mandrel 108 to thereby stabilize the shaped portion of fabric 92, it being understood that the reversal in shape of cup 106 has no adverse effect thereon. This process of forming the cup 106 is similar to the cup forming procedure described in my U.S. Pat. 4,172,002 which issued on Oct. 23, 1979, and is incorporated herein by this reference thereto.

A laminated blank 100 with its formed cup 106 is removed from frame 102 and placed in a conventional trim die (not shown) to be cut to the finished outline 109 shown in FIG. 15, and as such to become a right cup and side panel 70 of brassiere 60. To this end, the die cut component of FIG. 15 has opposite ends of a strap 62 joined to it at respective locations 110 and 112 and is attached by seam 74 to an identically constructed and developed left cup and side panel 72 of brassiere 60. The brassiere 60 is completed with the sewing attachment thereto of the hook 66 or eyelet 68 connector, as the case may be, as at 118, and may be imparted with a decorative scallop edge design 109.

From the foregoing it should be noted that the construction material of the brassiere cup 106 is that of non-moldable fabric, in this described example being cotton. This cup shape nevertheless is imparted to, and remains in this cotton fabric, as an extension of the partial frusto conical shape 106A that is assumed by the molded plastic content of blank 80, and more particularly of the portion thereof which bounds the brassiere breast opening 90. In this way, brassiere 60 is economically produced as a significantly more comfortable molded article of manufacture, in that it uses fabric having attributes conducive to comfort and economical fabrication in the construction thereof, even though such fabric is not itself moldable.

While the particular molded brassiere cup and side panel and its construction method herein shown and disclosed in detail is fully capable of attaining the objects and providing the advantages hereinbefore stated, it is to be understood that it is merely illustrative of the presently preferred embodiment of the invention and that no limitations re intended to the detail of construction or design herein shown other than as defined in the appended claims.

What is claimed is:

1. A method of molding a brassiere cup and side brassiere panel fabricated of non-moldable fabric and moldable fabric in a fabric-molding method comprising the steps of fusing a non-plastic content fabric comprised of interwoven fibers to a heat fusible plastic film by raising the temperature of the plastic film to cause a partial melting thereof and pressing the partially melted plastic film into the interstices of the interwoven fibers to produce a supply roll thereof, die cutting rectangular blanks from the aforesaid supply roll to produce a supply of first work-in-process blanks, die cutting within the peripheral edges of a said first work-in-process blank selected decorative shapes and in a selected location destined for the cup of the brassiere a circular opening for said cup, die cutting from a stretch fabric source rectangular shapes to produce second work-in-process blanks, superimposing one said second stretch fabric work-in-process blank over a first work-in-process blank so that said stretch fabric is in spanning relation across said brassiere cup circular opening, causing the projecting in a cup shape of said stretch fabric across said brassiere cup circular opening through said opening using a cup shaped molding die simultaneously with the molding into a partial frusto conical shape about said brassiere cup opening of said fusible first work-in-process blank in the portion thereof bounding said circular opening, and removing said stretch fabric cup shape from said molding die, whereby said cup shape that is imparted to said stretch fabric remains therein as an extension of said partial frusto conical shape in encircling relation thereabout.

2. The method of claim 1, including die cutting in each of said first and second blanks portions rearwardly extending portions from the blank portions in which the cups of the brassiere are located, wherein said rearwardly extending portions serve as the opposite sides of the brassiere.

* * * * *